United States Patent
Goh et al.

(10) Patent No.: US 9,672,480 B2
(45) Date of Patent: Jun. 6, 2017

(54) ADAPTIVE AND DYNAMIC DATA SYNCHRONIZATION SYSTEM FOR MANAGING DATA AND INVENTORY

(75) Inventors: Sweefen Goh, Hartsdale, NY (US); Jakka Sairamesh, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2408 days.

(21) Appl. No.: 11/127,980

(22) Filed: May 12, 2005

(65) Prior Publication Data
US 2006/0271600 A1 Nov. 30, 2006

(51) Int. Cl.
*G06F 15/177* (2006.01)
*G06Q 10/06* (2012.01)
*G06F 17/30* (2006.01)

(52) U.S. Cl.
CPC ....... *G06Q 10/06* (2013.01); *G06F 17/30581* (2013.01)

(58) Field of Classification Search
CPC . H04L 45/22; H04L 41/0663; H04L 67/1002; H04L 67/1034
USPC .......... 709/221, 223–224; 370/216–217, 228
See application file for complete search history.

(56) References Cited

U.S. PATENT DOCUMENTS

| | | | |
|---|---|---|---|
| 6,292,905 B1 * | 9/2001 | Wallach et al. | 714/4 |
| 6,850,901 B1 * | 2/2005 | Hunter et al. | 705/26 |
| 7,363,366 B2 * | 4/2008 | Ocko et al. | 709/223 |
| 2002/0163882 A1 * | 11/2002 | Bornstein et al. | 370/227 |
| 2003/0126200 A1 * | 7/2003 | Wolff | 709/203 |
| 2004/0003050 A1 * | 1/2004 | Lewis | 709/208 |
| 2004/0122871 A1 * | 6/2004 | Hansen et al. | 707/204 |
| 2005/0188242 A1 * | 8/2005 | Rabbat et al. | 714/4 |
| 2006/0248034 A1 * | 11/2006 | Soderberg et al. | 707/1 |
| 2009/0225650 A1 * | 9/2009 | Vasseur | H04L 41/0668 370/218 |
| 2014/0237123 A1 * | 8/2014 | Dave et al. | 709/227 |

* cited by examiner

*Primary Examiner* — Hitesh Patel
(74) *Attorney, Agent, or Firm* — Tutunjian & Bitetto, P.C.; Jennifer R. Davis (57) ABSTRACT

A system and method for adaptive and dynamic synchronization includes a data synchronization controller which enables synchronization of a plurality of different data types between a main computer and one or more remotely disposed computer elements. The controller includes an orchestrator which responds to requests for data synchronization for components in accordance with predetermined policies maintained by a policy management system. A synchronization interface is controlled by the orchestrator in accordance with the policies to select a synchronization engine to service requests for synchronization of different data types from the orchestrator. Synchronization may be handled for on demand and/or for on schedule requests for synchronization in the policy-based system and method.

16 Claims, 11 Drawing Sheets

ADAPTIVE AND DYNAMIC DATA SYNCHRONIZATION SYSTEM FOR MANAGING DATA AND INVENTORY

BACKGROUND

1. Technical Field

The present invention relates to a framework for managing data and synchronization of stored data or inventory, and in particular to a system and method for addressing inquiry or order failures using available resources in a policy-based environment.

2. Description of the Related Art

Retail enterprises may include hundreds or even thousands of small and medium retail stores that provide sales, inventory and other services to customers. The retail stores have many computational and display nodes to enables shopping for products or services, looking up prices, inventory accepting orders, etc. The retail stores obtain information on customers, inventory levels of products and latest product prices from the enterprise, and these are done based on policies such as on-demand, periodic or enterprise-driven ways of invoking the sharing of information. Information created at the retail stores (e.g., orders by customers) gets periodically updated by the store to the Enterprise systems.

A retail store may need important information from and Enterprise system, but for a number of reasons may be unable to contact the Enterprise system servers electronically. Such information may include the latest pricing, inventory or other information needed to make a sale. In the current environment, most retail stores have to wait until the communication is reestablished or repaired to the Enterprise system. This could result in the loss of sales, taking orders where products or services are not available due to lack of inventory or staff, and ultimately in customer dissatisfaction.

SUMMARY

A system and method for sharing information includes after trying to connect to a main computer from a local node in a system, failing to receive up-to-date information from the main computer. The up-to-date information is requested from one or more alternate nodes which have access to the main computer or have accessed the main computer more recently than from the local node. A reply and the up-to-date information are received from one of the alternate nodes wherein the up-to-date information is more current than the information at the local node.

A system includes a data synchronization controller which enables synchronization of data between a main computer and one or more remotely disposed computer elements. The controller includes an orchestrator which responds to requests for data synchronization for a plurality of components in accordance with predetermined policies maintained by a policy management system. A synchronization interface is controlled by the orchestrator in accordance with the policies to select a synchronization engine to service requests for synchronization from the orchestrator.

Data synchronization is performed dynamically on demand and/or on schedule. Synchronization is driven and/or controlled by policies, which externalizes the dynamic aspect of the data synchronization, and provides the ability to synch any data type (using different synch engines dictated by the policies).

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide an adaptive and dynamic way for enabling retail stores to get enterprise information by monitoring, detecting and adapting to communication failures by looking for other potential trusted peers with inventory, price information or other information needed.

In particularly useful embodiments, retail stores of other peer sources dynamically synchronize information based on policies established by a main policy making source, such as an Enterprise server. Retail stores servers which maintain retail prices, inventory and order information can adapt to failures by contacting peer retail stores in a local region or within a broader region in a dynamic fashion by maintaining status with the retail servers with a network or region.

The retail servers detect the failures automatically by monitoring the system components such as network connectivity, retail server performance and application. A dynamic routing mechanism may be provided on the retail store server configuration and maps of the retail stores within a region or worldwide. Reliability is provided to the retail stores by enabling access to the Enterprise through another retail store or stores and receives the appropriate information for prices, availability, etc. in time to make a sale.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Data synchronization components for a network based commerce system will be described in terms of an enterprise system or a central server or database. The enterprise may include one or more servers and provide information updates and maintain up-to-date records of information. While the system will be described in terms of a business enterprise with distributed locations, the present invention is much broader and may be employed in a distributed network framework where contemporaneous information sharing is needed.

The functionalities of a synchronization aspect of the system may include the following features: 1) capability to synchronize data between system nodes, for example, from commerce components such as catalogs, prices, offers, orders, promotion, membership profile information, etc.; 2) capability to synchronize data based on at least the following request types: "on-demand", "timer-based" and "multi-channel access"; 3) provide sync-orchestration to handle synchronization processes between commerce functions on the store server and the enterprise server; 4) capabilities for a synchronization engine to handle "what" and "when" type inquiries to synchronize based on policies; 5) capabilities to handle failures of all kinds, e.g., disconnection, memory loss, low disk-space, special exceptions and others.

One of the capabilities of the data synchronization component is to create an autonomic system to self-manage and self-recover from failure and other system events. A formal and consistent way of capturing the dynamic aspect of request information, and knowledge to respond to various aspects of behavior of the system and synchronization process is provided. The knowledge is needed to be able to self-manage the system in situations that could change dynamically. The entities of response to the various aspects of situations should be externalized from the application code where changes can be easily made without changing the application codes.

One approach taken to accomplish this is to make an embodiment of the data synchronization system, a policy and state machine based system. Policy is used to capture the dynamic aspect of the data, and the state machine mechanism is used to capture the dynamic aspect of the response (to the data). For example, data components can be synchronized using a plurality of different synch engines depending on data-type. These engines may be selected by a policy set up by an authority, such as an enterprise server. Should it be desired to change these assignments, the authority would only have to reissue the policy, thereby setting changing the synch engine or other components employed for specific tasks, such as synchronization of data, etc.

Figure 1:
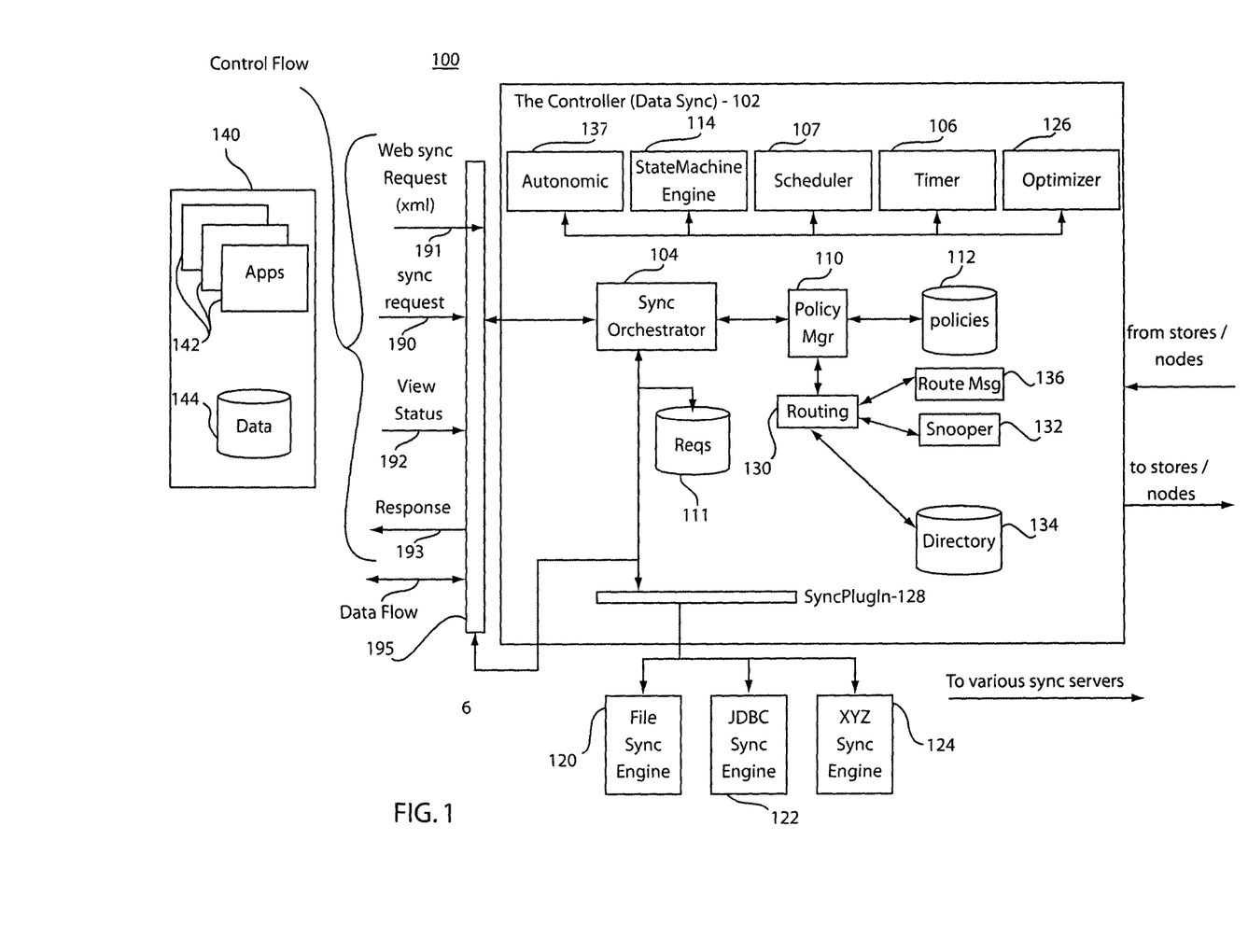
FIG. 1 is a block/flow diagram showing a system having a data sync controller for handling synch requests in a system.

Referring now to the drawings in which like numerals represent the same or similar elements and initially to FIG. 1, a high-level logical view of a data synchronization system 100 with core logical components and the interaction among the components is illustratively shown. A controller 102 includes modules and systems for managing data synchronization between a main system and remote system. Controller 102 may include a sync orchestrator 104, which provides interfaces for communication, status and response for the other application components.

Controller 102 may include many functions and features to provide acceptable synch results. A timer service 106 may be provided. Timer 106 may perform known methods to permit timing among components, such as applying timestamps to objects, etc. In addition, a policy management system 112 may employ an existing package service, which may be commercially available.

Synch orchestrator or orchestrator 104 functions as the managing unit of the data synchronization component or controller 102. Orchestrator 104 provides services (with a list of interfaces) to enable components to request synchronization, and creates state machine instances to carry on the sync request. The orchestrator 104 also maintains all registered listeners for notification of sync status, and also carries out the notification and sync-status information.

The orchestrator 104 handle sync requests from one or more system components (e.g., on-demand sync). The request may include the XML document (that includes policies which may be maintained in a policy management system 112 and managed by a policy manager 110) of the synchronization process. The orchestrator 104 creates a sync request state machine using a state machine engine 114 to process and persist the synchronization request and manage the status of the request while in operation. The orchestrator 104 invokes the policy manager 110 to obtain policies 112 for a synchronization, and set up a scheduler 107 (if needed) for generating the synchronization events.

In one example, the orchestrator 104 may invoke a pre-specified data-sync engine (e.g., file synch engine 120, JDBC (JAVA™ Database Connectivity) synch engine 122 and/or XYZ sync engine 124) to begin the sync process. The sync-engines 120, 122, 124 interface with the component data for synchronization to be performed. The orchestrator 104 responds to the component once the synchronization finishes, and updates the request status. The orchestrator 104 chooses the synch engine based on policies from the policy manager 110.

The scheduler 107 maintains pending sync requests to wait for their turn to be synchronized. The two main tasks of the scheduler 107 include initiating the sync when the scheduled time is up and maintaining queue of scheduled sync requests. The queue includes due sync requests. To keep the integrity of the data, the order of the sync requests received is maintained, the syncs that are due have to be suspended to wait for their turn to sync.

The state machine engine 114 maintains all the sync request state machine instances. It accepts events and dispatches the events to the appropriate state machine instances and performs the corresponding actions. Engine 114 may be employed to react to system failures, such as failures in communication with an enterprise server or the like.

An optimizer 126 may be employed to attempt to optimize the sync by making sure that the minimum amount of syncing is performed and yet satisfy the client request to get the most updated sync request. If the sync condition, which is expressed through policy, includes a delta (difference) guarantee of freshness, then a scheduled or queue sync will be abandoned if the previous sync request (of the same data) is still within the freshness threshold.

The policy manager 110 is the mediator between the data sync controller 102 components and the policy-management system 112. Policy manager 110 knows the raw format of a policy that is used by the policy-management system 112 and translates it to, e.g., a java object that is understood by the other components. When other components make a request for information, the policy manager 110 will solicit guidance/decisions from the policy-management system 112 and then present the result in, say, java objects type understood by the data sync controller 102 components. The policy-management system 112 is expected to notify the policy manager 110 of any updates of the policies, then the policy manager 110 will notify data sync controller 102 of such change so that appropriate steps can be taken.

A sync engine plug-in 128 performs the actual synchronization with the server or servers. This interface may include a generic interface that can be performed by any synchronization engine of a specific data type and be plug-and-play into the present framework.

The orchestrator 104 and sync engine (SyncPlugIn 128 implementation) may be packaged as a web application and installed as resources, e.g., "Sync Engine Orchestrator Provider" and "General Sync Engine Provider". JNDI (JAVA™ Naming and Directory Interface) names may be associated with each one of the resource names and a component that needs these services will do a JNDI lookup to get the services, similar, e.g., to a JDBC Provider resource.

On-schedule sync requests and any situation (events) and responses will preferably be stored in policy files. The policy file will be loaded to the policy-management system 112 at the system startup time. Policies are not expected to change too much over time. However, if they do change, the policy-management system 112 will handle and notify the data sync orchestrator 104 of the appropriate updates. To check or request the status for synchronization, a call-back mechanism 195 is provided where the listeners register with data sync 102 and pass a call-back interface 195. The data sync 102 will notify the listeners through the provided call-back interface when the sync has been completed (e.g., response 193).

The following is an exemplary sequence of component interactions using controller 102:

Get the orchestrator resource by doing a JNDI name lookup:

SyncOperation syncCtrl=(SyncOperation) new InitialContext( ).lookup(SyncOrchestrator.Name);

Register with the orchestrator:

SyncCtrl.register(id)

If there are any scheduled policies in a policy file, load the policies:

SyncCtrl.loadPolicies(InputStream);

Perform any operations/queries defined in syncCtrl (SyncOperation).

The data sync engine interface 128 needs to be able to sync any type of data format. An abstraction layer or interface of a sync engine needs to be defined so that different kinds of sync engines (e.g., 120, 122, 124, etc.) that know how to handle the synchronization of different data types can be replaced or instantiated easily. For an example, to sync an Excel® spreadsheet, a different sync engine may be needed which may be different from the sync engine used to sync any JDBC-compliant data base data.

The orchestrator 104 communicates with a sync engine (e.g., 120) via the sync engine adapter created that is compliant with a plurality of interfaces. Advantageously, the sync engine selected is preferably selected based on current policies 112 as provided by policy manager 110. In this way, any data type can easily be synchronized using the present system. The policy management system 112 may be used to define the policy grammar, evaluate and manage the policies.

Table 1 lists possible sync statuses returned from the sync engine to the components registered to receive the status of a sync request.

TABLE 1

| Exception code | Description |
| --- | --- |
| Sync_Success | Synchronization success. |
| Sync_Err_Failed | Synchronization failed. |
| Sync_Err_AuthFailed | Authorization failed. |
| Sync_Err_Conflict | A conflict occurred during synchronization. |
| Sync_Err_ConnFailed | Failed to connect to the target data source. |
| Sync_Err_NoData | The requested data is not found. |
| Sync_Err_OpFailed | An illegal operation occurred. |
| Sync_Err_OutOfMemory | Failed to allocate memory. |
| Sync_Err_ReadOnly | An attempt to update read-only data occurred. |
| Sync_Err_Timeout | A timeout occurred. |
| Sync_Err_ServerException | The server reported unknown exceptions. |
| Sync_Err_ServerBusy | The sync server is busy or is not responding. |
| Sync_Err_CancelSync | Canceling synchronization. |

TABLE 1-continued

| Exception code | Description |
| --- | --- |
| Sync_Err_HostUnknown | Unable to resolve host name |

Timer service 106 provides an alarm or wake-up service. It accepts a schedule time from a caller and notifies the caller when the time is up. The scheduler 107 uses this service for on-schedule sync. A JMX (JAVA™ Management Extensions) timer may be employed to provide this service. JMX timer service uses a JMX notification framework which is based on the JAVA™ event mechanism to notify the caller.

A router 130 provides an adaptive routing of requests if connection to the enterprise fails. The routers 130 will search thru the neighboring stores or nodes to act as a hub to send the request to the enterprise on its behalf. Every node or store may act as the hub to send a request to another hub or store.

A snooper 132 periodically pings neighboring stores or nodes to update its local cached directory 134 of the status of its neighboring stores/nodes. The policies detect what or where stores or nodes are "snooped" depending on where the current store or node is and when the snooping takes place.

Figure 2:
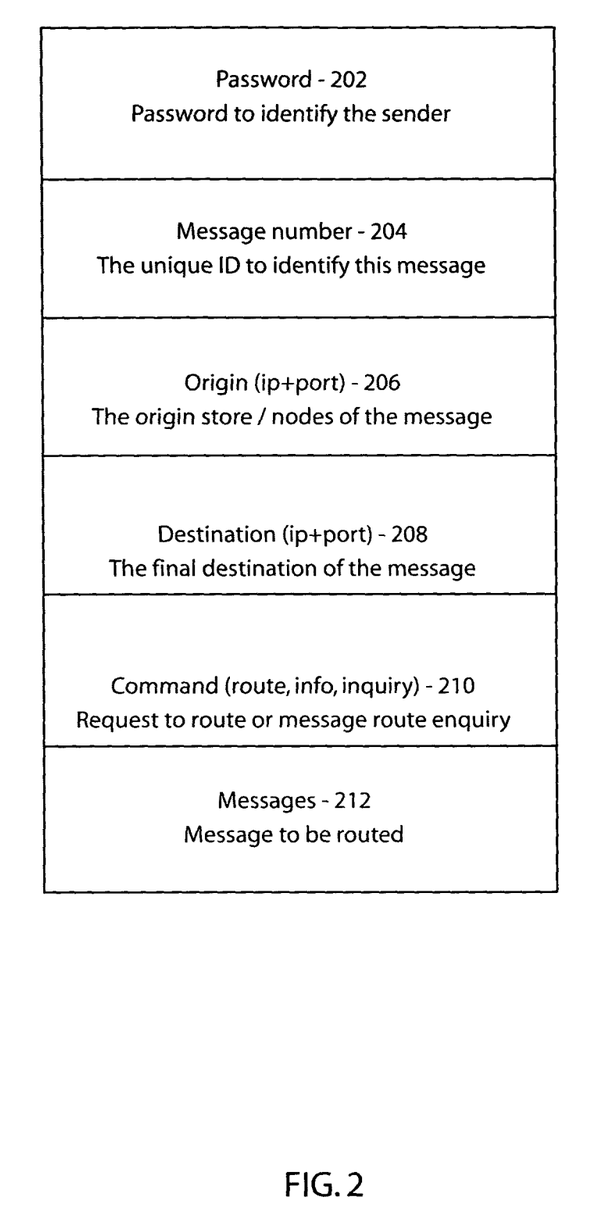
FIG. 2 is a routing protocol stack illustratively showing information content and routing used in requests.
Figure 3:
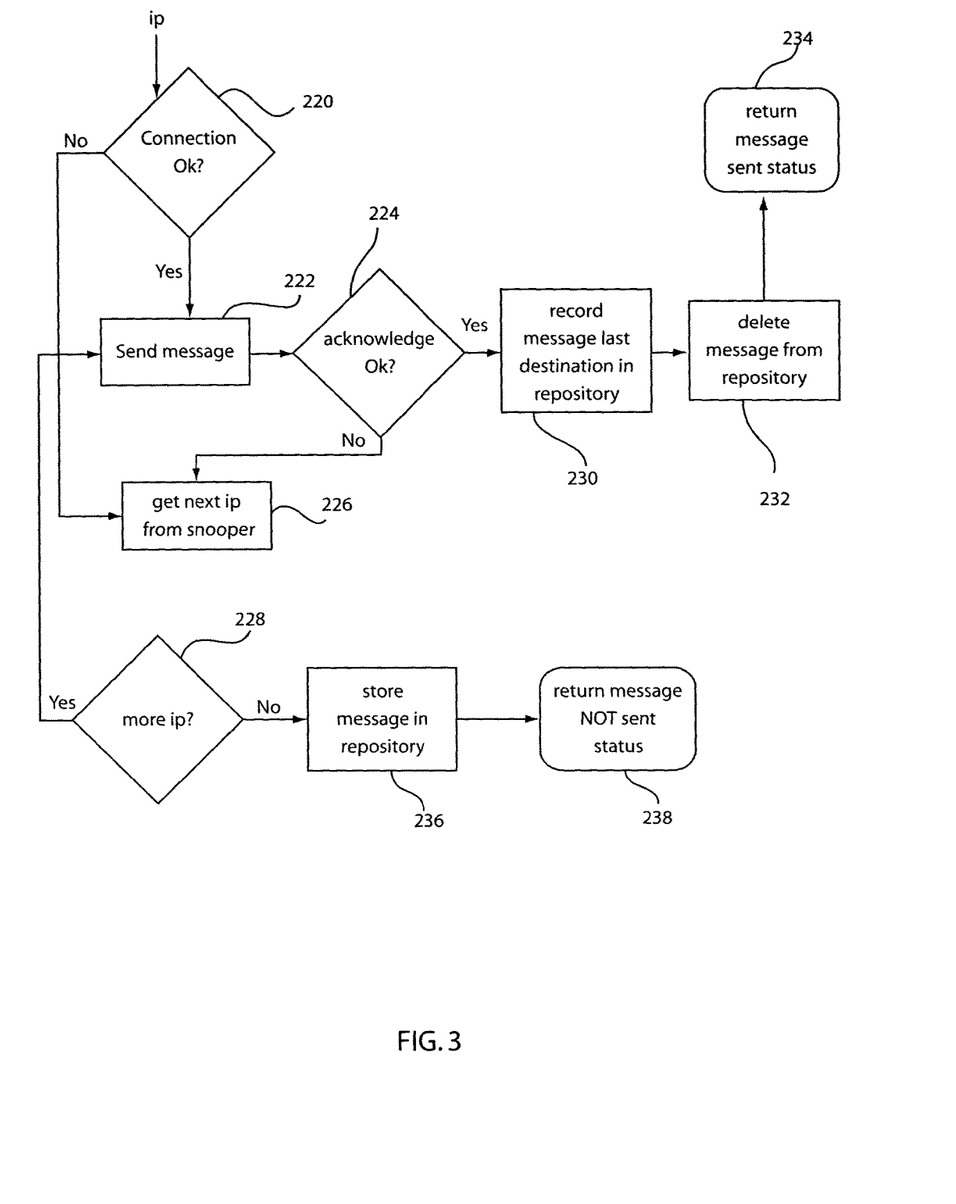
FIG. 3 is a routing flowchart illustratively showing request routing.
Figure 4:
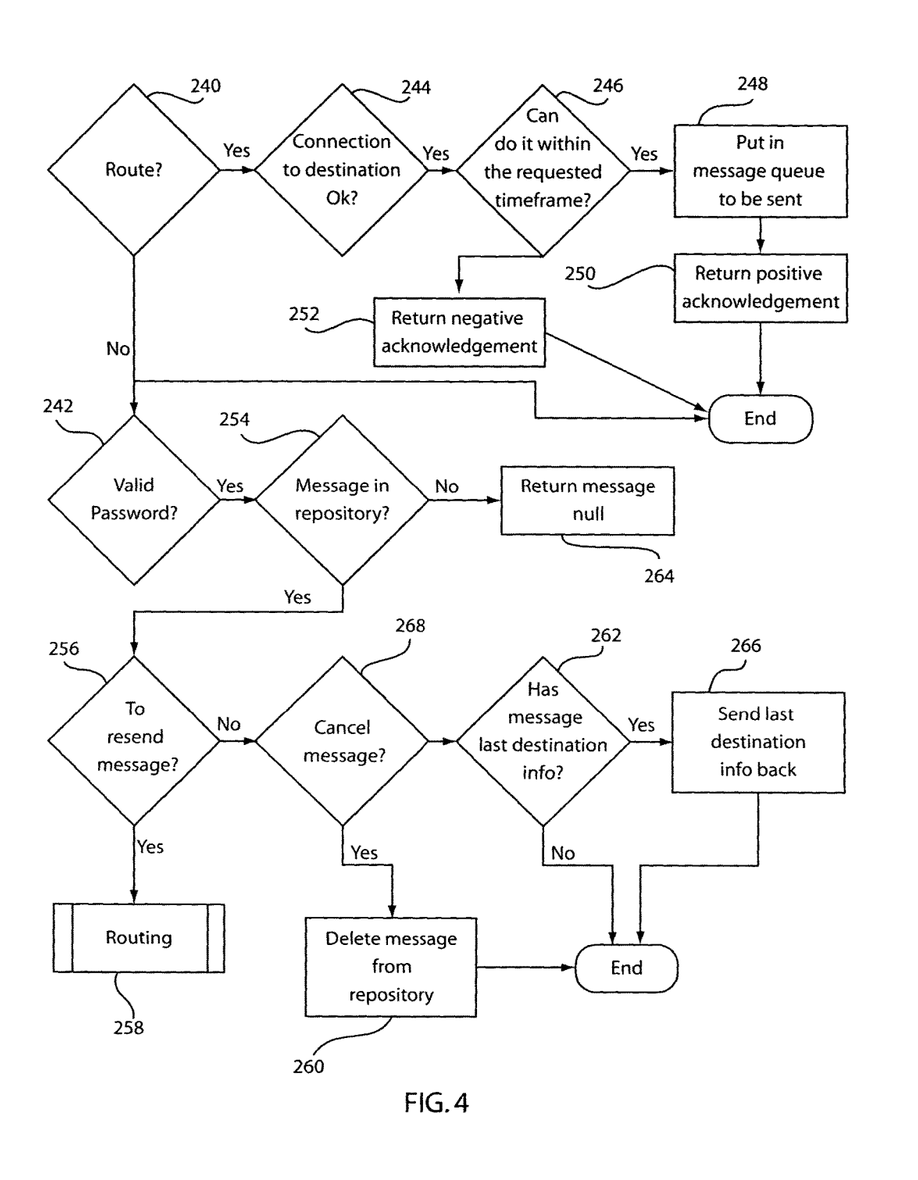
FIG. 4 is a flowchart illustratively showing how a request is handled.

A route message (RouteMsg) module 136 handles requests coming from other stores/nodes. The requests are either to route a message or inquiry regarding "message bean" route on behalf of another store. FIG. 2 illustratively shows a data structure of an example message request. FIGS. 3 and 4 illustrate the logic to handle such a request. An autonomic element 137 is also provided for monitoring and handling failure events, and notifying the sync-orchestrator 104 and the state machine engine 114, which reacts to these events.

A policy may be defined as an expression that informs a decision maker of the criteria that it is to use in order to make decisions.

A brief description of the policy definition/grammar will be presented here for illustrative purposes. Policy making and implementation may be made by other methods as well. A definition of a policy may be defined in terms of, e.g., 4-tuples. The 4-tuples components include Scope, Pre-Conditions, Measurement Intent and Business Value. This 4-tuple can be expressed or stored in a standard XML format. The XML format policies can also be easily loaded and translated into the 4-tuple format. Each policy has a name which is called a decision name. A GUI-based policy definition tool may be provided that allows users to create, modify and delete policy definitions.

Scope includes a context or domain within which the policy applies, e.g. who is the subject of the intent of the policy. Pre-condition may be thought of as "if clauses" within a policy. The policy pre-condition should be evaluated as true to be considered as a candidate for expression. Measurable intent may be thought of as "then clauses" within a policy. If the pre-condition is evaluated to true then this measurable intent will be returned. A measurable intent can be stated as a solicited Decision request, as an unsolicited Action or as an unsolicited Goal.

A Decision is a solicited request from application (Data Sync 102) for "Policy Guidance". In response, the system will return one or more pieces of information. Both Actions and Goals represent unsolicited direction. An Action pushes pieces of information (rather like a Decision) down to the application. A Goal pushes an "objective" down to an application. Business value is a statement of business priority. This portion of a policy definition is used when there are conflicts between related policies and it is necessary to calculate economic tradeoffs. Business value may be substituted with any quantifiable comparison and need not be economic in value or nature. For now, business value may be used for illustration purposes, but this policy definition may include any simple numeric priority.

Using policy based methodology, "what" to sync, "when" to sync, "where" to sync and "how" to sync are all expressed in term of policies 112. Using this approach, an application system 140 having a plurality of applications 142 can separate data 144 from the logic, making the application system more "alive" and dynamic to handle different situations without changing the application codes.

By basing decisions, such as which synch engine should be selected, on policy, the system 100 does not need to change any setting, reboot the system or reset parameters. Instead, the policy dictates which synch engine is selected in accordance with say, a data type. Should the policy change, the policy is updated and the system continues to operate without resetting.

An example of using policy to express a sync request includes, e.g., if a sync request policy is to perform the sync midnight everyday at one point, then later it is decided to change the sync schedule to 6 AM, the only thing that needs to be performed is to update the policy without changing the application codes and without shutting down and restarting the application again. There are many ways of expressing policy and interpreting policy.

Control flow from application system 140 provides a sync-request 190 which captures the specific details of the synchronization demanded by the component (e.g., application 142 or data 144). In an example where a plurality of retail stores communicate with an enterprise server, the request 190 includes data object types (or "what") that need to be synchronized between the in-store server and the enterprise server, the time at which the synchronization needs to be performed ("when") between the in-store server and enterprise server, and the mechanism ("how") that implements the synchronization.

The confirmation events and the notification rules for the component are also provided in the request as well as a specification of the audit-trails and log information needed for synchronization. The request may provide for handling of failures that could potentially occur during the synchronization process. The failure handling can be automated to provide self-management capabilities.

The sync-request process and the data synchronization interaction with other components are depicted in FIG. 1. Once the request 190 is received the policy manager 110 is activated to handle the "what", "when" and "how" process for synchronization. The sync-orchestrator 104, based on the request data type, will invoke the appropriate data-sync engine 120, 122, 124, etc. based upon the policies 112 of the policy manager 110.

Web synch requests 191 are handled in the same way as requests 190. In addition, messages and queries (e.g., view status 192) may be satisfied using requests 191. Reponses 193 may be returned synchronized.

Calls for data sync requests may be asynchronous calls. The caller who requested services will provide a callback object; the data sync component 102 will notify the caller through the callback when sync has been completed (response 193). For on-schedule sync which is loaded at startup time, a caller can register with data sync 102 to be notified with the status (view status 192) of the sync.

The four major tasks in data synchronization include the tasks to schedule sync, handle due scheduled sync, on-demand sync and perform the sync. These are dynamic processes. During the instantiation of the data synchronization singleton, all the scheduled sync requests defined in the policies are loaded from the policy management system 112 and pass them to the scheduler 107 to handle the scheduling (schedule synch). The on-demand sync requests are requested during runtime. It is preferably an asynchronous request where the component provides a call-back function. The on-demand request is also handled by the scheduler 107 to put the request in the queue to maintain the order of similar requests to maintain data integrity; and also oblige any relevant policies, if any, imposed on the sync requests. For due scheduled sync, the timer 106 notifies scheduler 107 when it is time to sync the scheduled sync, the scheduler 107 will put the due sync request in the queue to maintain the order of similar requests in order to maintain data integrity; and also oblige any relevant policies, if any, imposed on the sync requests.

For a sync request, it is through the scheduler 107 queue that the sync request is extracted from and sent to the data sync engine 120 to get synced. A separate thread is created to handle the sync queue, this thread will keep checking the queue for a sync request and as soon as there's a request in the queue, it sends the request to the orchestrator 104, the orchestrator 104 in turn would send the request to the data sync engine 120. When the sync status is returned from the data sync engine 120 through interface 128, all listeners registered to be notified for this specific sync request will be notified.

Referring to FIG. 2, a routing protocol is illustratively shown for a request for synchronization in accordance with one embodiment of the present invention. A password 202 is used to identify the sender. A message number 204 provides a unique id to identify the message. An origin 206 may include an ip address and port (ip+port) to id the origin, e.g., store/nodes, of the message. A destination 208 (ip+port) provides the final destination of the message. A command 210 (route, info, enquiry) provides a request to route or message route enquiry. The possible commands include route message, resend message, cancel message to be routed, find address where the message was last sent, etc. Messages 212 provide the message(s) to be routed.

Referring to FIG. 3, a routing flow chart is provided showing an illustrative method for routing messages using system 100 (FIG. 1). An Internet protocol (ip) or other communication line is checked for suitability to determine if the connection is satisfactory. If not, the snooper (132, FIG. 1) checks a next ip in block 226. If the connection is satisfactory, the message is sent in block 222. An acknowledge check is performed in block 224. If acknowledgement of receipt of the message is made, then the last message destination is recorded in a repository block 230, otherwise the path again goes to block 226.

When the message is stored in the repository, it is deleted in block 232 and a message sent status is returned in block 234. After block 226, a check for more ip's is performed in block 228. If more ip's are present, the messages are sent in block 222. Otherwise, the messages are stored in the repository in block 236 and a message not sent status is returned in block 238.

Referring to FIG. 4, the routing module 130 of system 100 determines when to route message/requests within the system 100. In block 240, a decision is made to route a message or messages. In block 244, a check on the connection to the destination is made, if ok, a check is made whether the message can be routed on time in block 246. If it can be routed on time, the message is queued for sending in block 248, sent and acknowledged in block 250. If the message cannot be sent on time, a negative acknowledgement is provided in block 252.

If no routing is decided in block 240, a password check is performed in block 242. If the password is valid in block 242, a check is performed to see if the message is in the repository in block 254. If not in the repository, a null message is returned in block 264. If the message is in the repository, a decision to resend the message is made in block 256. If yes, the message is routed in block 258. If no, a decision to cancel the message is made in block 268. If the message is not to be cancelled a last destination info check is made in block 262. If last destination information is available, it is returned in block 266, otherwise the process is ended. If the decision to cancel is made in block 268, the message is deleted from the repository in block 260.

Every sync request has its own life cycle, for example a sync request could be in queue state while it is waiting for its turn to be synchronized or in a failed state when the sync process has failed. A sync request that expects to be self managed and self recovered cannot rely on a static life cycle, the life cycle should be able to dynamically change to respond to various aspects of behavior of the system and synchronization process. Finite state machines are employed with system 100 and used to define all the possible dynamic changes of the states and the corresponding actions to the various states.

Using finite state machine mechanisms (114) also provides a simple framework for customization where the sync request life cycle and the corresponding actions can be changed or redefine easily without major change of the application codes.

Figure 5:
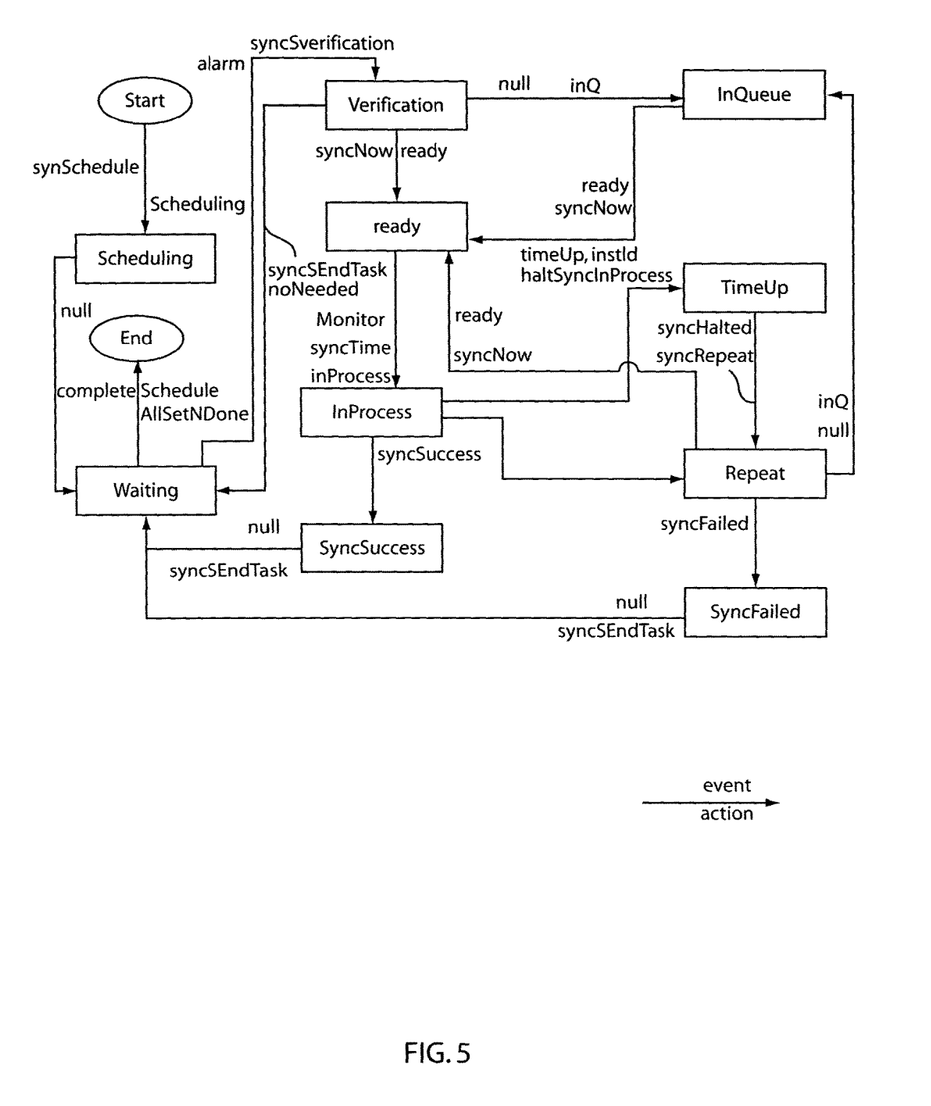
FIG. 5 is a state machine diagram illustratively showing an on-schedule synch request life cycle.
Figure 6:
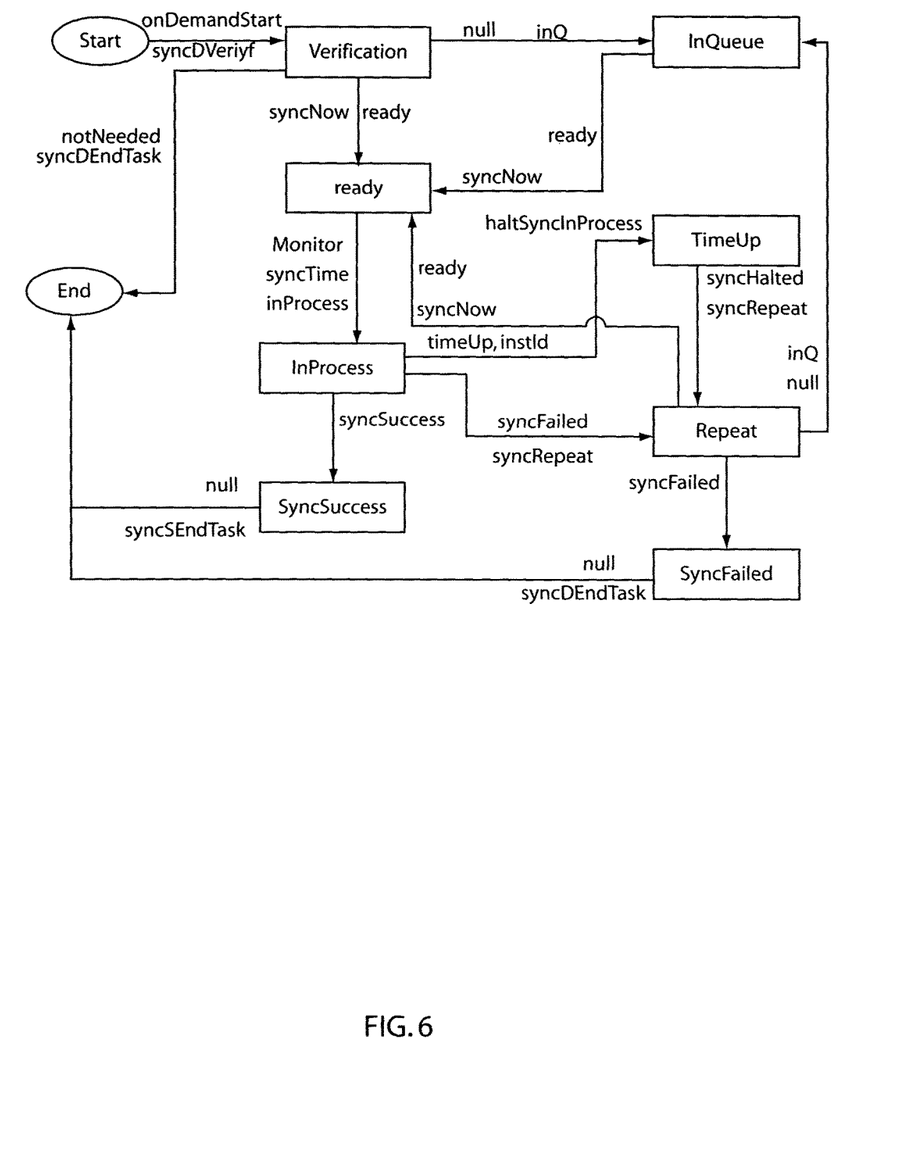
FIG. 6 is a state machine diagram illustratively showing an on-demand synch request life cycle.

Different state machines may be employed; two are illustratively depicted in FIGS. 4 and 5. One state machine 271 (FIG. 5) is used for an on-schedule sync request and another state machine 273 (FIG. 6) is for an on-demand sync request. These state machine definitions may be defined in XML format which would be imported into the data synchronization system at start up time. Whenever there is a need to change the state machine definition in terms of states, action or events; the only thing that needs to be changed is to update the definition (XML file) and reload it back to the system.

Figure 7:
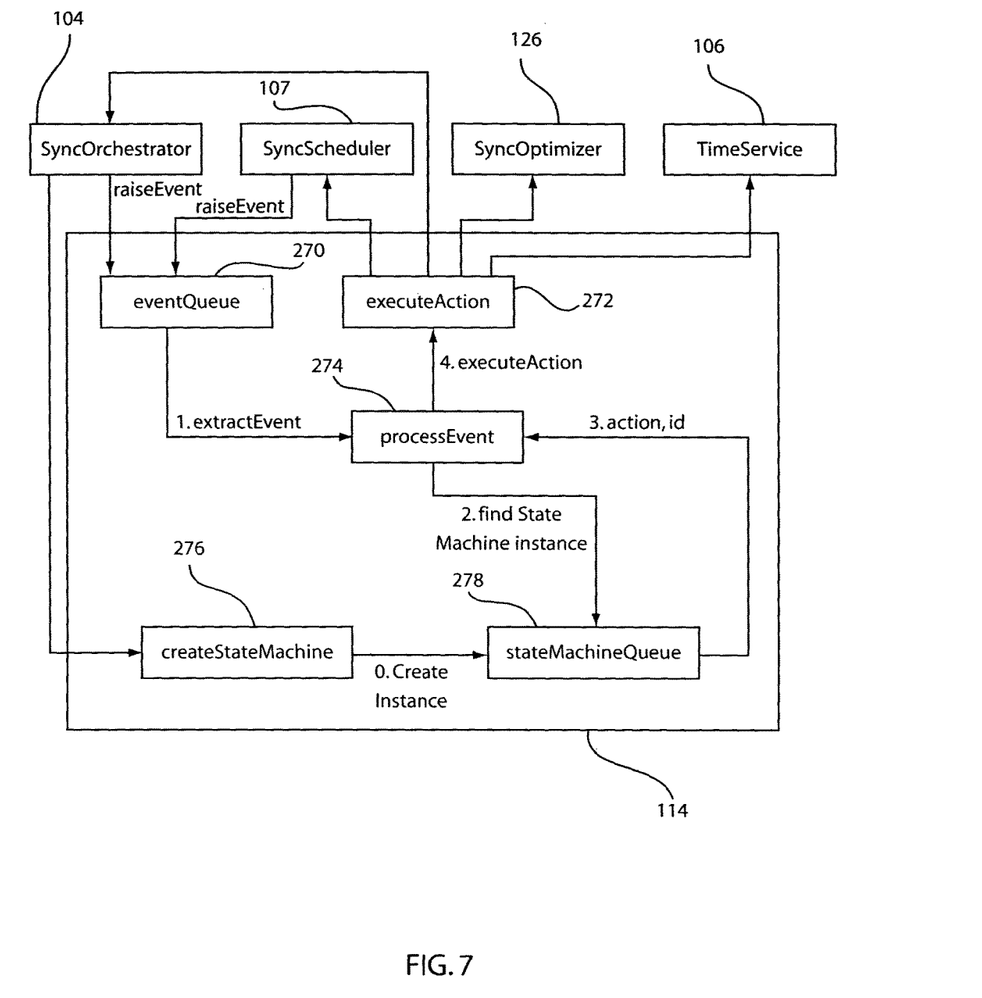
FIG. 7 is a diagram illustratively showing state machine engine interaction with components of a controller.

Referring to FIG. 7, a state machine engine 114 is employed for finding and creating state machines in accordance with requests from orchestrator 104. A command to create a state machine 276 is provided from orchestrator 104, and an instance of a state machine is created and placed in a state machine queue 278. An event processor 274 processes the next state machine in queue 278 in accordance with events in an event queue 270. The event is processed and an action is executed in execute action block 272 in accordance with an action id. The results of execution are provided to components (e.g., orchestrator 104, scheduler 107, optimizer 126, timer service 106, etc.).

Given the functionality, the state machine usage and policy-based system as described above, embodiments of the present invention may be implemented in a plurality of different applications. These functions may support at least one or more of the following capabilities. The capability: 1) to synchronize data from components, such as, commerce components e.g., catalogs, pricing, offers, orders, promotion, access control, membership profile information, etc.; 2) to synchronize data based on the requests from the applications, e.g., "on-demand", "on-schedule" and "multi-channel"; 3) to orchestrate and to handle synchronization processes between components on servers and the remote enterprise server; 4) to handle synchronization based on policies defined by the managing entity of the retail store or node; 5) for the synchronization engine to handle "what", "when" and "how" for synchronizing. The synch engine(s) can be pluggable into the overall framework to handle database to database sync or file-system based synchronization; 6) to handle failures of all kinds, e.g., disconnection, memory, low disk-space, special exceptions and others; 7) to provide simple self-managing functionality to handle failures, and recover from failures based on predefined and negotiated policies.

Figure 8:
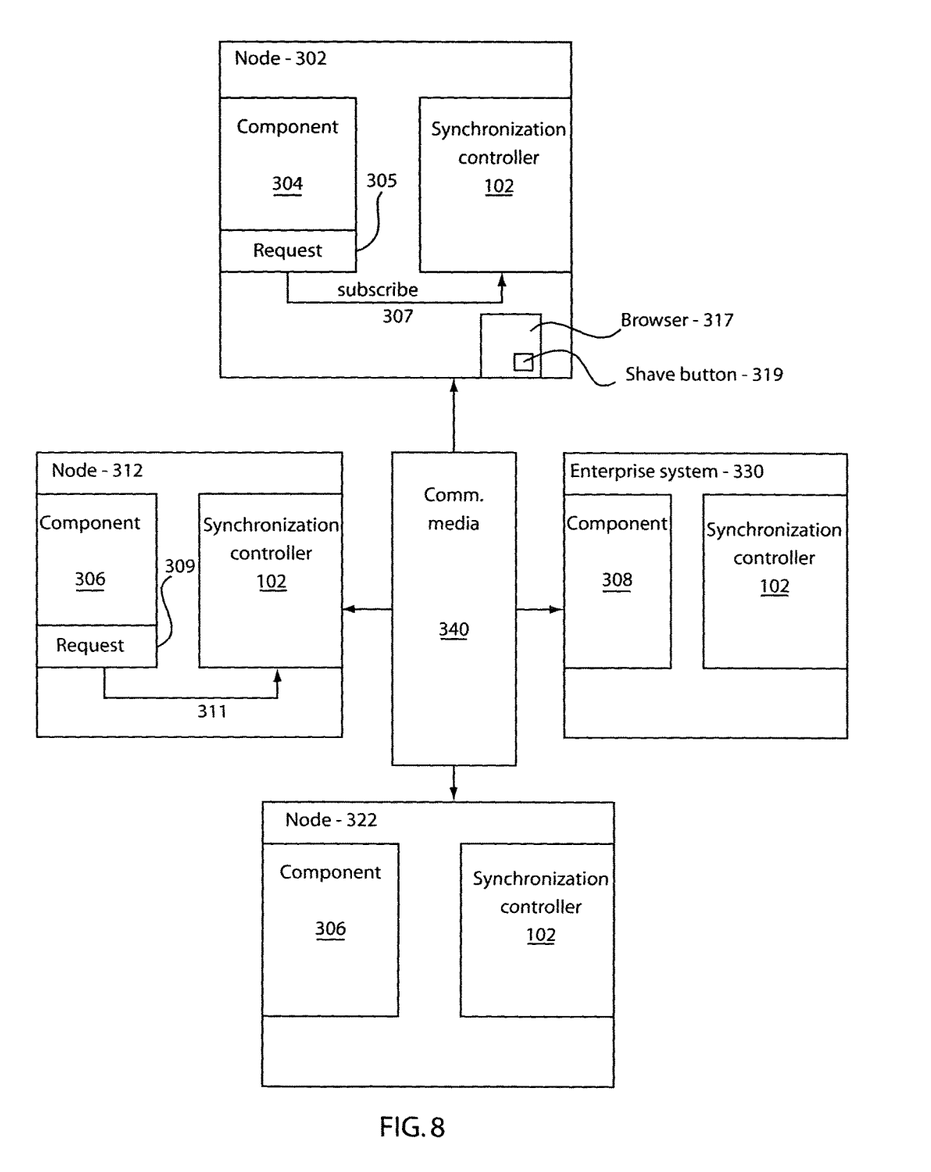
FIG. 8 is a block/flow diagram showing a particularly useful implementation of the controller in a distributed system.

Referring to FIG. 8 with continued reference to FIG. 1, one embodiment of the present invention will now be described in terms of a retail store chain having an enterprise or main computer or server 330 located remotely from a plurality of nodes (302, 312, 322), which may include, e.g., retail stores, fulfillment centers, warehouses, and the like. An in-store server synchronization component or controller 102 as depicted in FIG. 1 is employed at each location and addresses the following use cases. Each location may include fewer than all of the capabilities outlined by system 100 in FIG. 1.

The synchronization component 102 may include one of the following subcomponents: a synchronization engine (sync-engine) 120, 122, 124 for handling the actual data synchronization between objects. Orchestrator (sync-orchestrator) 104 to manage the various synchronization processes. The autonomic element 137 for monitoring and handling failure events, and notifying the sync-orchestrator 104. The policy manager 110 to maintain and invoke policies on synchronization requests placed by components 304, 306, 308. The scheduler 107 to schedule periodic synchronization requests for components that have subscribed to the sync engine 120, 122, and/or 124. The router 130 is employed to perform adaptive routing of requests. An event manager (e.g., state machine engine 114) to handle event sensing and notification to appropriate components through the sync orchestrator 104.

The synchronization controller 102 provides flexibility to allow for plug-and-play of sync-engines (e.g., relational and others), and support standards, support multiple data types such as files, file-system and relational data. Advantageously, this is performed by employing policies set by system 330.

In accordance with one aspect of the present invention, a flexible policy-based model for handling component and data synchronization is provided by synch component or synch controller 102 through the use of policy management as implemented by orchestrator 104. These policies provide a flexible way to represent and specify what, when and how to synchronize data. Autonomic functions 137 and state engines 114 for handling failures such as disconnection, low disk-space, disk and memory errors, and others, and automatic recovery mechanisms to handle component specific requirements on failure-recovery procedures are also provided by controller 102.

Further, services to support modification of synchronization requests and policies on synchronization during runtime, and management services for components on composing, modifying, deleting, and obtaining status on synchronization requests are also provided by controller 102.

An on-demand use-case provides functionality to any commerce component 304, 306, 308 to request the synchronization of some or all parts of the data that is managed by the component. The synchronization is done between the sync controllers 102 of the nodes 302, 312, 322, etc. and the enterprise system 330, or between components with a node.

Consider a commerce component 304 (e.g., a catalog, price list, inventory amount, availability date, location, sale price, etc.), in this case say, a catalog, that wishes to synchronize the catalog product information and price lists (corresponding to each of the products).

The use-case is as follows. The commerce component 304 composes a request (sync-request) 305 for synchronization to be done for a specific data set (e.g. product set or category tree) or a view of the data set. The commerce component 304 subscribes 307 to the synchronization component 102 for the sync operation to be done. The sync-orchestrator 104 handles the specific sync-request and launches the sync process. The sync-orchestrator 104 invokes the sync-engine with the appropriate parameters specified in the sync-request. The sync-orchestrator 104 interprets the sync-requests parameters. Once the synchronization is completed, a sync-engine (e.g., 120, 122, 124, etc.) reports back the status to the sync-orchestrator 104, which then informs the specific components through message passing or event mechanisms, as described above. If during synchronization, a failure occurs, the autonomic element 137 registers the failure event (through, e.g., JMX) and informs the sync-orchestrator 104 of the failure.

Based on the specific failure event, the sync-orchestrator 104 recovers from the failure based on the state of the sync-process.

An on-schedule use-case provides functionality to any commerce component (e.g., 304, 306, 308) to request the synchronization of some or all parts of the catalog at a given specific time or periodically. The use-case is as follows. A commerce component, say 306 requests a synchronization to be done for a specific data set (e.g. product set or category tree) at a specific time of day or periodically. The commerce component 306 subscribes 311 to the synchronization component for the synch operation to be done. The sync-orchestrator 104 handles the specific synchronization request 309 by launching the sync process. The orchestrator 104 invokes the sync engine (e.g., 120, 122, and/or 124) with the appropriate parameters. If during synchronization, a failure occurs, the autonomic element 137 registers the failure event (e.g., through JMX) and informs the orchestrator 104 of the failure. Based on the specific failure event, the orchestrator 104 recovers from the failure based on the state of the sync-process using state machines 114.

An on-demand use-case provides functionality to any commerce component to request the synchronization of some or all parts of the catalog. The use-case may be as follows. A user places an order through another channel (e.g., phone or home web-browser). The user decides to pick up the purchased goods from a nearby, recommended store (e.g., node 302) that has the good available. The user enters the store physically, and requests to display the order just placed. The order component 304 requests a synchronization to be done for a specific data set (e.g. product set or category tree). The order component 304 subscribes to the synchronization component 100 for the synch operation to be done. The sync-orchestrator 104 handles the specific synchronization request by launching the sync process. This may include opening a browser 317 and activating a collaborative sharing button 319. Other triggering events and/or implementations may also be employed.

The orchestrator 104 invokes the sync engine (120, 122, 124, etc.) with the appropriate parameters. If during synchronization, a failure occurs, the autonomic element registers the failure event (e.g., through JMX) and informs the orchestrator 104 of the failure, and the state machine reacts to the event.

A message adaptive routing use case handles failed connections to the enterprise system 330. Neighboring stores or nodes 302, 312, 322 collaboratively share network and bandwidth resources. In one example, store 302 needs to send a message to enterprise 330 (or any store or node). No connection from store 302 to enterprise 330 is available at that time. Store 302 searches neighboring stores 312, 322 for stores that willing and able to send the message to the enterprise 330 within the next number of minutes (specified or default, say, x minutes). Store 312 responds positively and accepts the message. In the next few minutes, say y minutes, the store 312 connection to the enterprise 330 fails. Store 312 searches neighboring stores (302, 322) for stores that are willing and able to send the message within the next x-y minutes.

Store 322 responds positively and accepts the message. Store 322 then successfully sends the message to the enterprise 330. The next x+y minutes, store 302 queries store 312 for the status of the message. Store 312 responds with the store 322 ip address. Store 302 queries store 322 for the status of the message. Store 322 responds with the enterprise 330 ip address.

Other collaborative implementations may also be employed. For example, alternate nodes 312 and 322 may be employed as a way of communicating with system 330 if node 302 is unable to connect to node 330. Nodes 312 and 322 may be employed to place an order, track a product or perform other synch or collaborative functions.

Nodes 302, 312, 322 and 330 may include communication media 340, which may include a dedicated network or communication system, the Internet, a telephone system (wired or wireless), satellite or any other means for remote communication.

Figure 9:
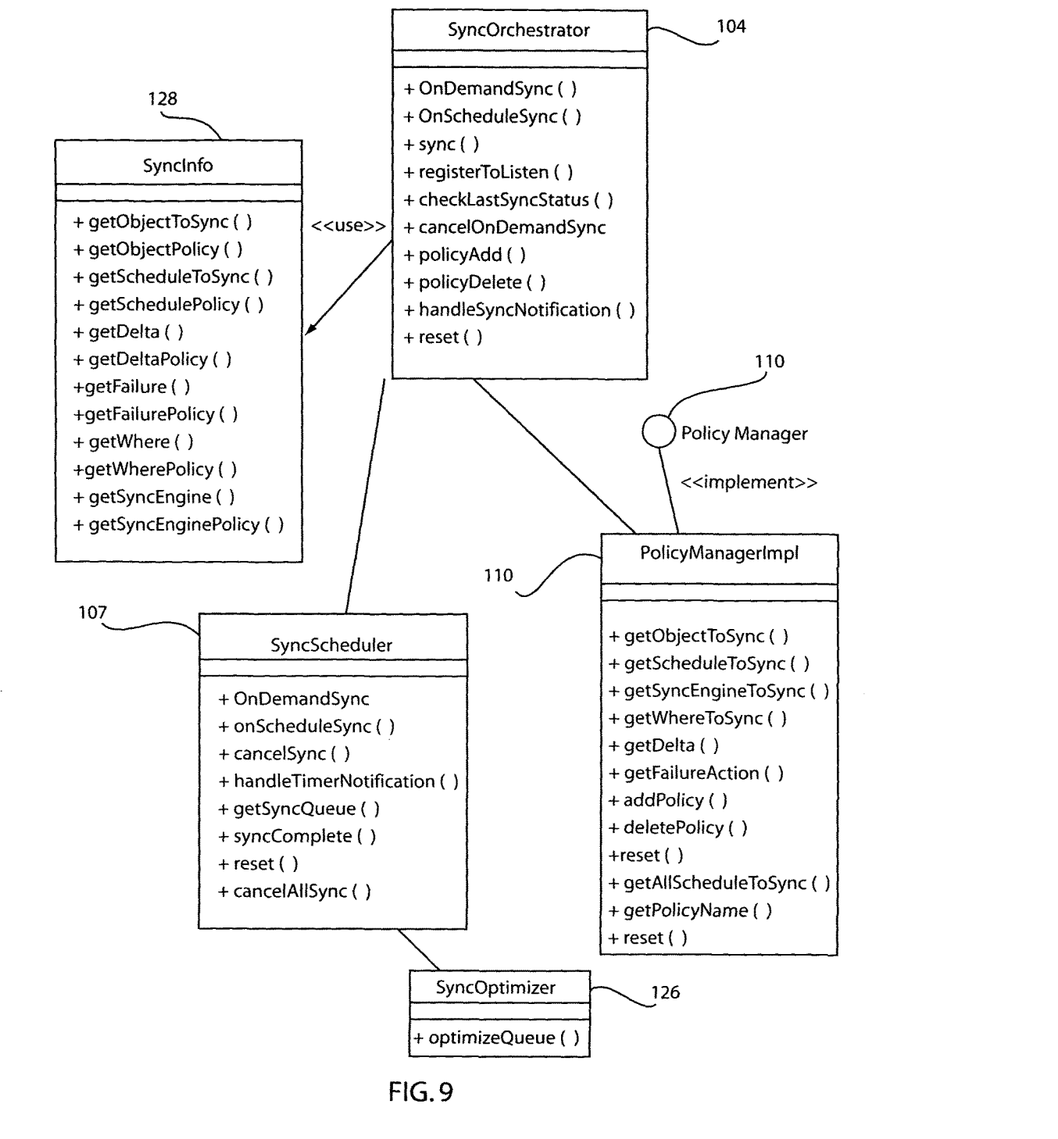
FIG. 9 is a diagram showing class interactions for components of the controller in handling component requests.
Figure 10:
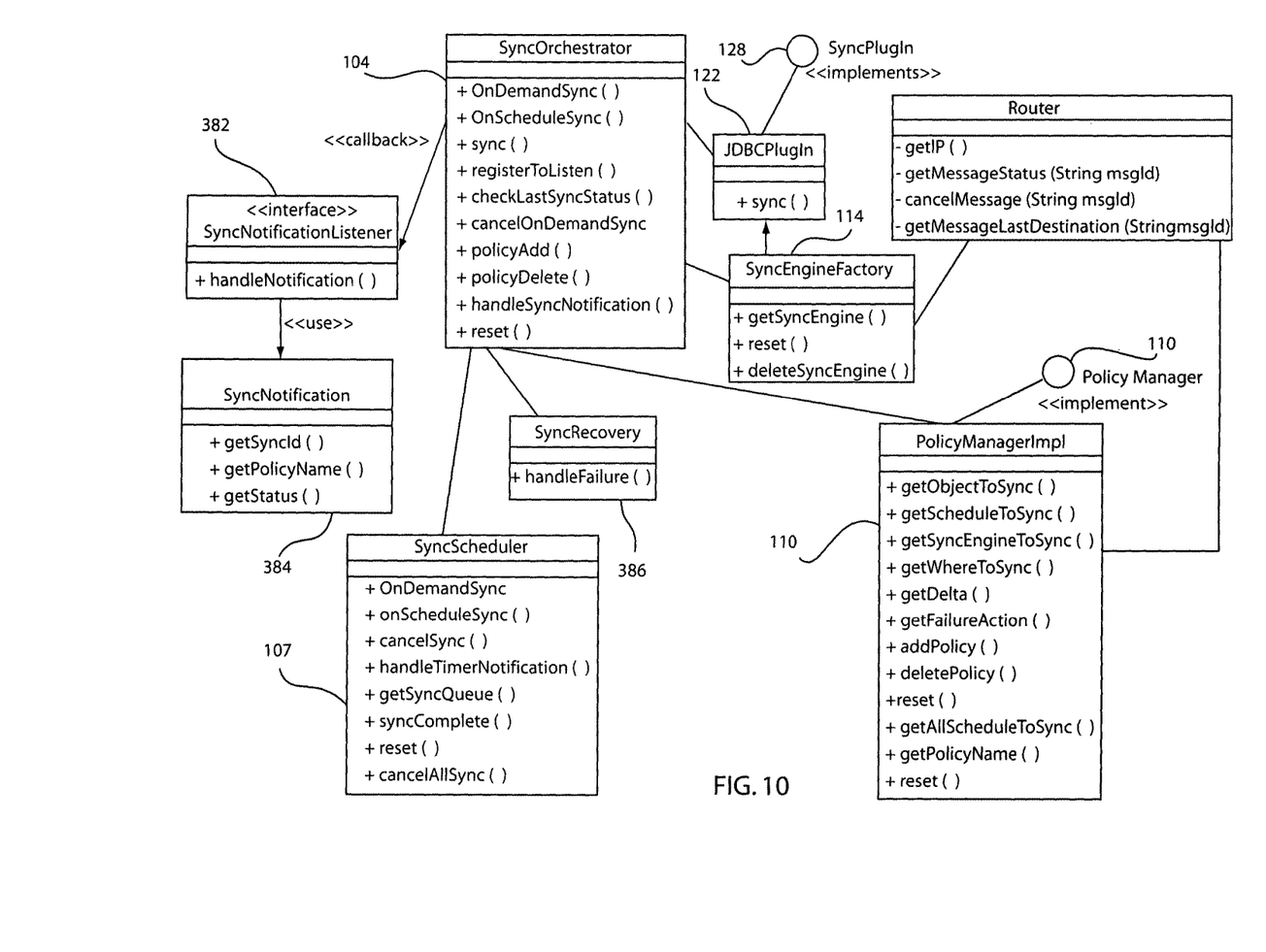
FIG. 10 is a diagram showing class interactions for when synchronization begins and ends.

Referring to FIGS. 9 and 10, static diagrams show the interaction between illustrative core classes to perform some exemplary data sync tasks. FIG. 9 shows component requests and shows the classes for interaction when the data sync gets a request from a component. The request can be a non-demand sync, checking sync status or cancel a sync. FIG. 10 shows the class interaction when a sync begins and ends. Components depicted in FIG. 10 are also show in FIG. 1. Some of the objects shown includes a listener object 382 which listens for a callback and responds with a synch notification 384. Also, a synchrecovery object 386 alerts policy manager 110 when a failure occurs during the synch process.

Figure 11:
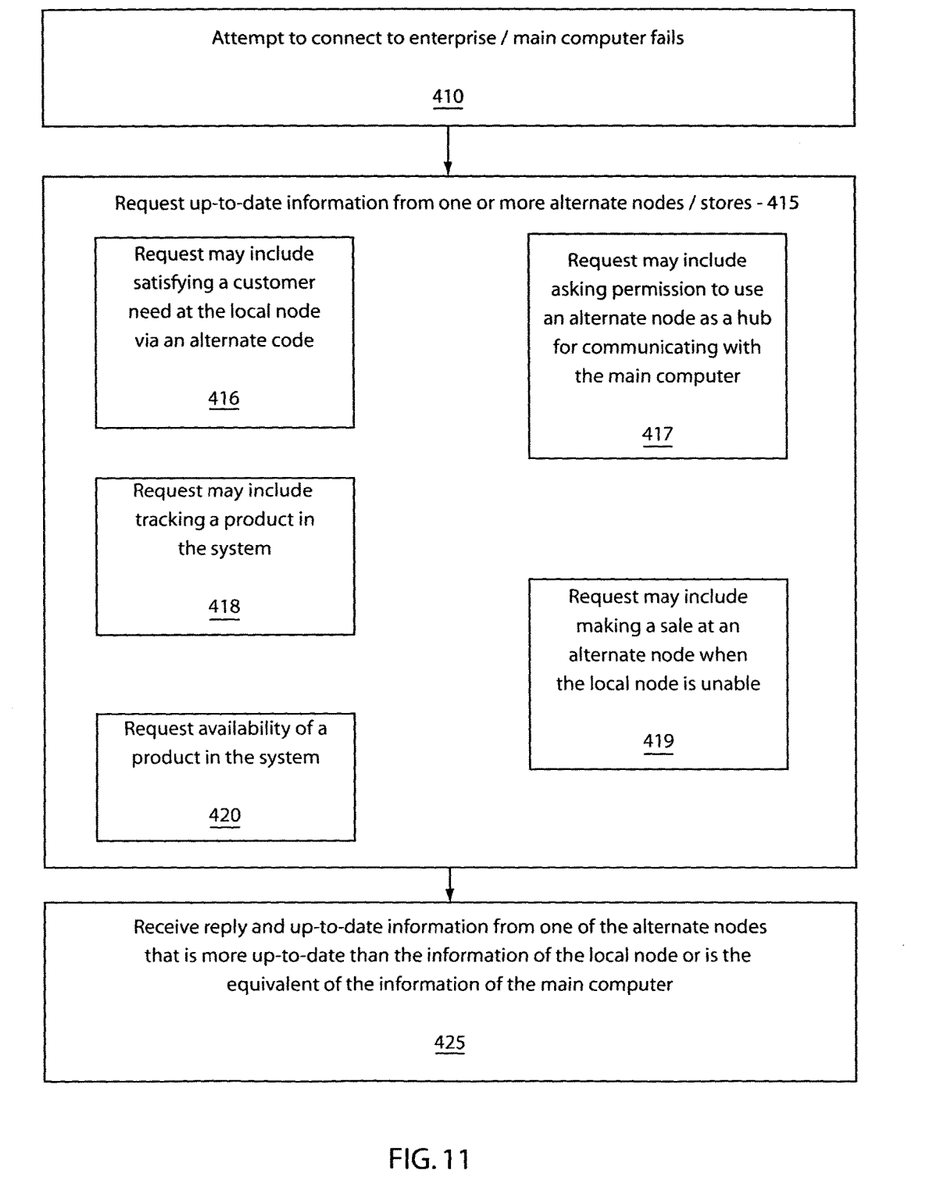
FIG. 11 is a block diagram showing an illustrative method for one useful embodiment of the present invention.

Referring to FIG. 11, a method for sharing information is illustratively shown. In block 410, an attempt to receive up-to-date information from the main computer (e.g., enterprise) is made, but fails from the local node in the system. In block 415, a request for the up-to-date information is then made to one or more alternate nodes which have access the main computer or have accessed the main computer more recently than from the node. In block 425, a reply and the up-to-date information may be received from one of the alternate nodes wherein the up-to-date information is more current than a version stored on the local node, and preferably the information is equivalent to the up-to-date information stored on the main computer.

The requesting of the up-to-date information may include sending a request for quote to the one or more alternate nodes to satisfy a consumer need at the local node in block 416, requesting to employ an alternate node as a hub for communication with the main computer in block 417, tracking a product in the system in block 418, requesting an alternate node to make a sale that the local node is unable to make in block 419, and/or requesting availability of a product to the alternate nodes in block 420.

Advantageously, since controller 102 is policy based, synchronization may be performed on any data-type form of the request. Since the policy sets up a synch engine to be assigned the task of synchronization of the data type, any and all known data types can be handled and synchronized by controller 102.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for sharing information, comprising the steps of:
   upon failure of a local node to directly communicate with a main computer, said local node
   searching for one or more alternate nodes which are willing and able to communicate with the main computer within the next X number of minutes;
   determining if said one or more alternate nodes have accessed the main computer more recently than the local node;
   requesting up-to-date information from said one or more alternate nodes which have access to the main computer and have accessed the main computer more recently than the local node;
   requesting to employ said one or more alternate nodes as a hub for communication with the main computer;
   receiving a reply and the up-to-date information from one of the one or more alternate nodes wherein the up-to-date information is more current than a version stored on the local node, wherein the step of receiving includes synchronizing a component based upon a policy-based synchronization controller expressing synchronization protocols in terms of policies, wherein said policy-based synchronization controller comprises a policy manager requesting guidance from a policy management system, wherein the policy manager translates results to a type understood by components of the policy-based synchronization controller, and wherein the synchronizing is performed by a synchronization engine selected in accordance with a policy for a given data type of the component; and
   optimizing the synchronizing by ensuring that a minimum amount of synchronizing is performed while still satisfying the request for the up-to-date information.

2. The method as recited in claim 1, wherein the requesting the up-to-date information includes sending a request for quote to the one or more alternate nodes to satisfy a consumer need at the local node.

3. The method as recited in claim 1, wherein the requesting the up-to-date information includes tracking a product in the system.

4. The method as recited in claim 1, wherein the requesting the up-to-date information includes requesting said one or more alternate nodes to make a sale that the local node is unable to make.

5. The method as recited in claim 1, wherein the requesting the up-to-date information includes requesting availability of a product to the one or more alternate nodes.

6. A computer program product comprising a computer readable program stored on a computer-readable device, wherein the computer readable program when executed on a computer causes the computer to:
   attempt to connect to a main computer from a local node in a system to receive up-to-date information from the main computer;
   upon the local node failing to connect to the main computer, the local node searching for one or more alternate nodes which are willing and able to communicate with the main computer within the next X number of minutes, determining if said one or more alternate nodes have accessed the main computer more recently than the local node, requesting the up-to-date information from one or more alternate nodes which have access to the main computer and have accessed the main computer more recently than from the local node, and requesting to employ an alternate node as a hub for communication with the main computer;
   receive a reply and the up-to-date information from one of the one or more alternate nodes wherein the up-to-date information is more current than a version stored on the local node, wherein the step of receiving includes synchronizing a component based upon a policy-based synchronization controller expressing synchronization protocols in terms of policies, wherein said policy-based synchronization controller comprises a policy manager requesting guidance from a policy management system, wherein the policy manager translates results to a type understood by components of the policy-based synchronization controller, and wherein the synchronizing is performed by a synchronization engine selected in accordance with a policy for a given data type of the component; and
   optimize the synchronizing by ensuring that a minimum amount of synchronizing is performed while still satisfying the request for the up-to-date information.

7. The computer program product as recited in claim 6, wherein the request for the up-to-date information includes sending a request for quote to the one or more alternate nodes to satisfy a consumer need at the local node.

8. The computer program product as recited in claim 6, wherein the request for the up-to-date information includes requesting said one or more alternate nodes to make a sale that the local node is unable to make.

9. The computer program product as recited in claim 6, wherein the request for up-to-date information includes requesting availability of a product to the one or more alternate nodes.

10. A method for dynamic synchronization of information between remotely disposed computers and a main computer linked by a network, comprising the steps of:
    requesting from a local node in the system to receive up-to-date information from the main computer;
    upon failure to connect to the main computer, said local node searching for one or more alternate nodes which are willing and able to communicate with the main computer within the next X number of minutes, determining if said one or more alternate nodes have accessed the main computer more recently than the local node, requesting the up-to-date information from said one or more alternate nodes which have access to the main computer and have accessed the main computer more recently than the local node, and requesting to employ an alternate node as a hub for communication with the main computer;
    receiving a reply and the up-to-date information from one of the one or more alternate nodes wherein the up-to-date information is more current than a version stored at the local node or is equivalent to having received the information from the main computer, wherein the step of receiving includes synchronizing a component based upon a policy-based synchronization controller expressing synchronization protocols in terms of policies, wherein said policy-based synchronization controller comprises a policy manager requesting guidance from a policy management system, wherein the policy manager translates results to a type understood by components of the policy-based synchronization controller, and wherein the synchronizing is performed by a synchronization engine selected in accordance with a policy for a given data type of the component; and
    optimizing the synchronizing by ensuring that a minimum amount of synchronizing is performed while still satisfying the request for the up-to-date information.

11. The method as recited in claim 10, wherein the requesting the up-to-date information includes sending a request for quote to the one or more alternate nodes to satisfy a consumer need at the local node.

12. The method as recited in claim 10, wherein the requesting the up-to-date information includes requesting said one or more alternate nodes to make a sale that the local node is unable to make.

13. The method as recited in claim 10, wherein the requesting the up-to-date information includes requesting availability of a product to the one or more alternate nodes.

14. A program storage device readable by machine, tangibly embodying a program of instructions executable by the machine and performing method steps for dynamic synchronization of information between remotely disposed computers and a main computer linked by a network, as recited in claim 10.

15. The method of claim 1, wherein if access of said one or more alternate nodes to the main computer fails, further comprising the step of said one or more alternate nodes searching for additional alternate nodes which have access to the main computer.

16. The method of claim 1, wherein the synchronization protocols comprise what, when, where and how to synchronize.

* * * * *